Dec. 12, 1950     W. NELSON     2,533,393
MECHANISM FOR MOVING A ROD OR OTHER
MEMBER IN A STRAIGHT LINE
Filed March 31, 1948

Inventor:
William Nelson
by
Pennie, Edmonds, Morton and Barrows
Attorneys

Patented Dec. 12, 1950

2,533,393

UNITED STATES PATENT OFFICE 2,533,393

MECHANISM FOR MOVING A ROD OR OTHER MEMBER IN A STRAIGHT LINE

William Nelson, Glasgow, Scotland, assignor to James Howden & Company Limited, Glasgow, Scotland, a company of Great Britain Application March 31, 1948, Serial No. 18,170
In Great Britain April 9, 1947

2 Claims. (Cl. 74—100)

This invention relates to a mechanism for effecting the movement of a member in a given direction, and particularly useful for fluid control valves of the type in which the valve is opened or closed by rotation of a rod screw-threaded over part of its length and coupled to the movable member of the valve proper.

An object of the invention is to provide a mechanism adapted to be operated quickly in an emergency, for example, in the opening of a valve.

In a valve, in connection with which the mechanism is illustrated, the valve rod passes through a plain hole in the valve body and there is provided a crosshead formed with a hole screw-threaded to mate with the screw-threaded rod, said crosshead being slidable on slide bars attached to the valve body, said slide bars being connected at the ends remote from the valve body by a cross bar, spring means being provided to urge the crosshead normally towards the cross bar, said cross bar being furnished with parallel links pivotally attached thereto, and movable to project towards the crosshead, and a coupling rod pivoted to the ends of the links remote from the cross bar.

The free ends of the links may be furnished with rollers adapted to roll on the crosshead.

Figure 1:
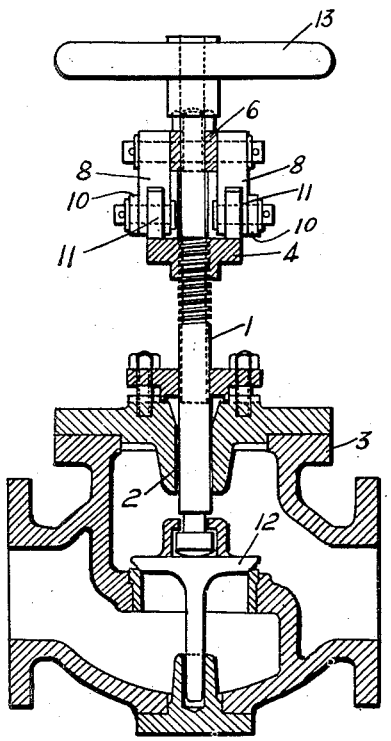
Figure 2:
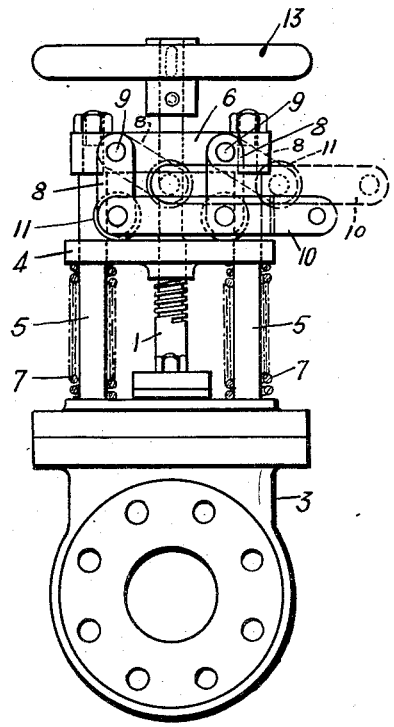

A practical embodiment of the invention is illustrated in the accompanying drawings in which Fig. 1 is a longitudinal vertical section of a valve, and Fig. 2 is an end elevation of a valve.

In the drawings, in which the mechanism is illustrated in connection with a valve, 1 denotes the rod, and 2 denotes the plain hole in the valve body 3. 4 denotes the crosshead slidable on slide bars 5 attached to the valve body 3. 6 denotes the cross bar, and 7 denotes springs urging the crosshead 4 towards the cross bar 6. 8 denotes parallel links pivoted at 9 to the cross bar 6, and 10 denotes a coupling rod connecting the ends of the links 8 remote from the cross bar 6. 11 denotes rollers provided at the ends of the links 8 remote from the cross bar 6. 12 denotes the movable member and 13 denotes an operating handle for rotating the rod 1.

In practice, to close the valve, the coupling rod 10 is moved to bring the links 8 against the crosshead 4 and to move the crosshead 4 along the slide bars 5 in opposition to the springs 7. When the links 8 have swung to the position where they are projecting at right angles to the cross bar 6, they will be in a "dead centre" position and will remain in that position despite the spring opposition. The rod 1 is rotated and advances through the screw-threaded hole in the crosshead 4 to close the valve. The full lines in Fig. 2 denote valve closed position. To open the valve, the coupling rod 10 is pulled in a longitudinal direction, thereby causing the links 8 to move away from their "dead centre" position. The crosshead 4, under the influence of the springs 7, moves in the direction away from the valve body 3 and swings the links 8 around their pivots 9 to the dotted line position shown in Fig. 2, the crosshead 4, in moving away from the valve body 3, carrying with it rod 1 and thereby opening the valve.

What is claimed is:

1. The combination with a rectilinearly slidable member of fixed parallel guides on which said member slides, a fixed bridge member joining said guides, spring means urging said slidable member in the direction towards said bridge member, a pair of parallel links of equal length pivoted to said bridge member, rollers carried by the free ends of said links and bearing on said slidable member, and an endwise shiftable rod coupling the free ends of said links.

2. An operating mechanism for moving a rod axially comprising a mounting, a pair of similarly spaced parallel bars each fixed to the mounting at one end, a cross bar fixed to the opposite ends of said bars, a crosshead slidable on said parallel bars, a rod attached to the crosshead and extending in movable relation through the cross bar and parallel to said parallel bars, spring means urging the crosshead toward the cross bar, at least one pair of spaced parallel links of equal length pivoted to the cross bar, a roller on the free end of each link engaging the crosshead, and a rod pivoted to the free ends of the links for swinging the links on their pivots and moving the rollers on the crosshead whereby movement of the crosshead and the rod attached thereto is obtained.

WILLIAM NELSON.

REFERENCES CITED

The following references are of record in the file of this patent:

UNITED STATES PATENTS

| Number | Name | Date |
|---|---|---|
| 966,672 | Ellison | Aug. 9, 1910 |
| 1,444,576 | Williamson | Feb. 6, 1923 |
| 1,552,833 | Fischback | Sept. 8, 1925 |

FOREIGN PATENTS

| Number | Country | Date |
|---|---|---|
| 191,599 | Great Britain | Jan. 18, 1923 |